Feb. 22, 1938.     T. A. HAMMOND     2,109,230
FILTERING VALVE AND THE LIKE
Filed July 25, 1934
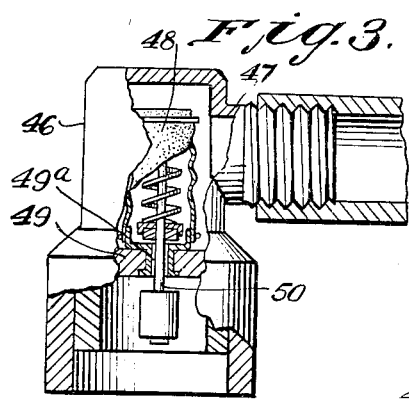
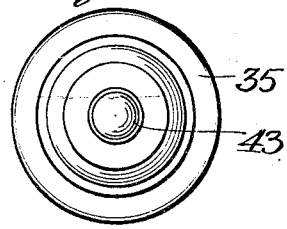
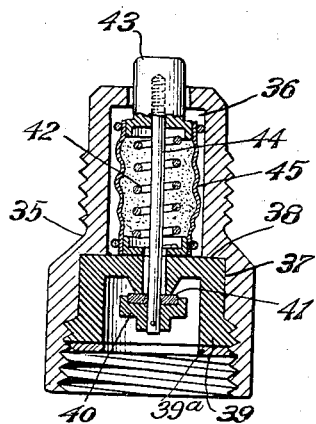
INVENTOR
Theodore A. Hammond
BY
Howard P. King
ATTORNEY Patented Feb. 22, 1938

2,109,230

UNITED STATES PATENT OFFICE 2,109,230

FILTERING VALVE AND THE LIKE

Theodore A. Hammond, Upper Montclair, N. J.

Application July 25, 1934, Serial No. 736,868

8 Claims. (Cl. 183—41)

This application is a continuation of my prior application S. N. 532,725 filed April 25, 1931, and relates back to my inadvertently abandoned application S. N. 721,713 filed June 23, 1924. This invention relates particularly to tire valves, inclusive of air-chucks, and the like for use in connection with pneumatic tires and intended either for permanent or temporary application or attachment to the commonly used valves of said tires.

The objects of the invention are to provide an improved type of valve attachment either to replace the conventional cap for such valves or applicable to such valves to permit the tire to be inflated and deflated; to provide a cap or connection which will filter the air passing from the source of supply into the tire; to thus prevent foreign matter from entering the valve of the tire tending to cause that valve to leak; to provide for hose connection to the cap of either the "press-on" type or the "screw-on" type; to provide a cap which can be left on permanently and which will insure against leakage of air from the tire; and at the same time provide a structure which can be readily applied and removed if so preferred; to secure simplicity of construction and operation; and to obtain other advantages and results as may be brought out in the following description.

In the accompanying drawing, like numerals of reference refer to the same parts throughout the accompanying views.

Figure 1 is a longitudinal cross-sectional view of a cap embodying my invention and providing a "screw-on" type of connection for applying to the usual tire valve;

Figure 2 is a plan or upper end view of the same, and

Figure 3 is a similar sectional view to Figure 1, partly in elevation, and showing an air-chuck of the "push-on" type.

Referring more particularly to Figures 1 and 2, there is illustrated a simple form of my invention intended to be applied to the usual tire valve stem in place of the cap usually applied thereto and which has to be removed therefrom when air is to be admitted or allowed to escape from the tire. This valve or cap of my invention may conveniently comprise a cylindrical body 35 within which is an upper chamber 36 and a larger lower portion 37 providing a downwardly directed shoulder therebetween. A hard rubber or other valve seating member 39 is screwed into the screw threaded lower end of the body portion. A valve head 40 with a suitable soft washer 41 is normally actuated upwardly toward the valve seat by means of a spring 42 pressing upon the underside of a stud 43 connected by valve stem 44 extending downwardly from the button through the spring, valve seat and washer to the valve head 40. Extending downwardly from the stud 43 to the seating member 39 is a flexible filter 45 which surrounds the spring and with the parts to which it is attached at its ends, closes the chamber 36 against passage of air outwardly through the valve seat until the said air has passed through the filter.

In operation, this cap is screwed tightly on the tire valve casing so that the gasket on the member 39 is pressed tightly on the tire valve casing end, and may be left on permanently. When inflating the tire, the hose connection is pressed tightly against the top of the cap, the pin in the hose connection forces the cap valve stem down, thus opening the valve. By utilizing proper length of valve stem in my valve, the lower end of the stem may be positioned substantially in engagement with the upper end of the stem in the tire valve. Consequently both valves are normally closed, but depression of stem 44 will cause a depression of the stem beneath and thus both valves are opened. A tire gauge may thus be applied and the tire may be deflated, if desired, by depressing the valve stem 44.

It is seen that I have provided a tire valve cap which may be left on permanently, containing an additional check valve to hold the air in the tire, and also one in which dirt and grit are excluded by virtue of filter 45. This structure accordingly acts as a filter for the air between the source of supply and the tire.

This same filtering structure may be utilized irrespective of whether the cap is adapted to be screwed on or pressed on the tire valve casing, and in Figure 3 is shown a valved coupling or air-chuck adapted to be pushed or pressed onto the valve casing. In this instance the air is shown coming into the body 46 through a lateral neck 47 and has to pass through a flexible cylindrical filter or filtering sleeve 48 in order to pass through the outlet 49 in the valve seat. The lower end of the valve stem in this instance, is intended to engage the valve stem of the tire valve when the device of my invention is applied to the valve casing. The upper end of the casing forms a stop for valve stem 50 and the parts are so proportioned that the lower larger end of said valve stem will not close the passage 49 when the valve stem is in its uppermost position. I wish to add at this time that both of the constructions shown provide a filter for the air between its source of supply, such as a pump, and the valve casing of the tire.

It is to be particularly noted that in each instance illustrated, there is provided a filter which may be termed a filtering sleeve, and by the use of that term I do not necessarily limit myself to the precise sleeve of any one modification.

Obviously other modifications and changes may be made in the construction and use of my invention, and I do not wish to be understood as limiting myself to the details of construction shown or described, except as set forth in the following claims when construed in the light of the prior art.

Having thus described my invention, I claim:

1. A device for application to a tire valve, comprising a casing having a valve head and valve seat therein, and filtering means in said casing at the inlet side of the valve head and valve seat and through which the air must pass to reach said valve head and valve seat, said filtering means having one part thereof fixed with respect to the valve seat and another part movable with the valve head.

2. A device for application to a tire valve, comprising a casing having a valve head and valve seat therein, and a flexible filter in said casing at the inlet side of the valve head and valve seat and through which the air must pass to reach said valve head and valve seat, said filter having one edge part thereof fixed with respect to the valve seat and another edge part movable with the valve head.

3. A device for application to a tire valve, comprising a casing having a valve head and valve seat therein, and a flexible sleeve-like filter in said casing at the inlet side of the valve head and valve seat and through the wall of which sleeve the air must pass to reach said valve head and valve seat, said filter having one end thereof fixed with respect to the valve seat and having its other end fixed to and movable with the valve head.

4. A device for application to a tire valve, comprising a casing having an inlet and an outlet, a valve head and valve seat disposed between the inlet and outlet, a filtering sleeve having transverse end members at the ends thereof, and a spring between said end members tending both to hold the sleeve normally distended longitudinally and to hold the valve head normally seated.

5. In a device for admitting air to a tire or the like, a body portion having an inlet and an outlet, a valve in said body portion positioned between said inlet and outlet, a spring normally seating said valve, and a filter in said body portion through which said filter the air must pass in going from the inlet to the outlet, said filter comprising a flexible and collapsible sleeve, and said spring being positioned within said sleeve and also functioning to hold the sleeve normally distended.

6. A device for application to a tire valve, comprising a casing having an inlet and an outlet, a valve head and a fixed valve seat within said casing between said inlet and outlet, said device also having a constant size restricted passage within said casing, a stem projecting from said valve head and extending through said restricted passage and valve seat with the part of the stem within said passage of constant diameter, whereby the restricted passage provides a constant ever present and restricted flow area, and a filter around said stem necessitating all air passing from said inlet to said outlet to pass through the material of the filter and to pass through said restricted opening next said stem in a direction longitudinally of said stem in its passage from the inlet to outlet during escape past the valve seat.

7. A device for application to a tire valve, comprising a casing having a valve head and valve seat therein, a stem on the valve head, a filter around the valve stem through which all the air must pass in its escape through the valve, and resilient means around the stem actuating said valve head to seat the same.

8. A device for application to a tire valve, comprising a casing having a valve head and valve seat therein, a stem on the valve head, a filter around the valve stem through which all the air must pass, said stem extending within the filter and spaced therefrom, and a spring around the stem within the filter actuating said valve head to seat the same.

THEODORE A. HAMMOND.